(12) United States Patent
Baudel

(10) Patent No.: US 6,928,436 B2
(45) Date of Patent: Aug. 9, 2005

(54) INTERACTIVE GENERATION OF GRAPHICAL VISUALIZATIONS OF LARGE DATA STRUCTURES

(75) Inventor: Thomas Baudel, Paris (FR)

(73) Assignee: Ilog SA, Gentilly Cedex (FR)

( * ) Notice: Subject to any disclaimer, the term of this patent is extended or adjusted under 35 U.S.C. 154(b) by 468 days.

(21) Appl. No.: 10/086,964

(22) Filed: Feb. 28, 2002

(65) Prior Publication Data

US 2003/0167278 A1 Sep. 4, 2003

(51) Int. Cl.[7] .............................................. G06F 17/30
(52) U.S. Cl. ........................................................ 707/6
(58) Field of Search .......................... 707/6, 2; 715/526

(56) References Cited

U.S. PATENT DOCUMENTS

| | | | |
|---|---|---|---|
| 5,608,850 A | | 3/1997 | Robertson |
| 5,689,628 A | | 11/1997 | Robertson |
| 5,751,931 A | | 5/1998 | Cox et al. |
| 5,765,146 A | * | 6/1998 | Wolf et al. ..................... 707/2 |
| 5,790,121 A | * | 8/1998 | Sklar et al. ................. 345/853 |
| 5,793,369 A | | 8/1998 | Atkins et al. |

(Continued)

OTHER PUBLICATIONS

Stolte, Chris, et al. "Polaris: A System for Query, Analysis, and Visualization of Multidimensional Relational Databases", IEEE Transactions on Visualization and Computer Graphics, vol. 8, No. 1, pp. 1–13, Jan.–Mar. 2002.

Bruls, et al. "Squarified Treemaps." In W. de Leeuw, R. van Liere (eds.), Data Visualization 2000. *Proceedings of the Joint Eurographics and IEEE TCVG Symposium on Visualization*, Springer, Vienna, 33–42 (2000).

http://www.inxight.com/about/. Feb. 13, 2002.

http://www.spotfire.com/about/, Feb. 13, 2002.

http://www.visualinsights.com/base_pages/mainhtml.asp?level1=one&level2=one&picked=1–1, Feb. 13, 2002.

*Primary Examiner*—Wayne Amsbury
(74) *Attorney, Agent, or Firm*—Ropes & Gray LLP

(57) ABSTRACT

A method and computer-executable program is disclosed for graphically rendering information of a database which can be arranged in form of a table, and for extraction associations between database records. An element and/or an arithmetic expression computed from the records in the database can be associated with a graphic representation consisting of instructions, such as setting a fill color, drawing a rectangle, and so on. Graphic renditions can include tables, histograms, bar charts, timeline displays, pie charts, and tree maps, as well as combinations of such displays. The proposed visualization-rendering method is flexible and computationally fast, since at most O(N) graphic instructions need to be generated for a database of N records.

20 Claims, 7 Drawing Sheets

U.S. PATENT DOCUMENTS

| | | |
|---|---|---|
| 5,812,134 A | 9/1998 | Pooser et al. |
| 5,831,631 A | 11/1998 | Light et al. |
| 5,847,972 A | 12/1998 | Eick et al. |
| 5,861,891 A | 1/1999 | Becker |
| 5,930,803 A | 7/1999 | Becker et al. |
| 5,937,064 A | 8/1999 | Eick et al. |
| 5,958,008 A * | 9/1999 | Pogrebisky et al. ........ 709/223 |
| 5,960,435 A | 9/1999 | Rathmann et al. |
| 5,973,693 A | 10/1999 | Light |
| 5,999,192 A * | 12/1999 | Selfridge et al. ........... 345/440 |
| 6,014,661 A | 1/2000 | Ahlberg et al. |
| 6,023,280 A | 2/2000 | Becker et al. |
| 6,026,399 A | 2/2000 | Kohavi et al. |
| 6,026,409 A | 2/2000 | Blumenthal |
| 6,034,697 A | 3/2000 | Becker |
| 6,075,530 A | 6/2000 | Lucas et al. |
| 6,075,536 A | 6/2000 | Kunieda et al. |
| 6,125,375 A | 9/2000 | Atkins et al. |
| 6,137,499 A | 10/2000 | Tesler |
| 6,151,595 A | 11/2000 | Pirolli et al. |
| 6,154,212 A | 11/2000 | Eick et al. |
| 6,182,058 B1 | 1/2001 | Kohavi |
| 6,199,082 B1 * | 3/2001 | Ferrel et al. ................. 715/522 |
| 6,199,098 B1 | 3/2001 | Jones et al. |
| 6,223,145 B1 | 4/2001 | Hearst |
| 6,232,984 B1 | 5/2001 | Chuah et al. |
| 6,236,994 B1 | 5/2001 | Swartz et al. |
| 6,243,093 B1 | 6/2001 | Czerwinski et al. |
| 6,252,597 B1 | 6/2001 | Lokuge |
| 6,300,957 B1 | 10/2001 | Rao et al. |
| 6,311,196 B1 * | 10/2001 | Arora et al. ................. 715/513 |
| 6,430,309 B1 * | 8/2002 | Pressman et al. ............ 382/133 |
| 6,457,045 B1 * | 9/2002 | Hanson et al. .............. 709/206 |
| 6,473,084 B1 * | 10/2002 | Phillips et al. .............. 345/440 |
| 6,613,098 B1 * | 9/2003 | Sorge et al. ................. 715/503 |
| 6,629,097 B1 * | 9/2003 | Keith ............................ 707/5 |
| 6,742,003 B2 * | 5/2004 | Heckerman et al. ..... 707/104.1 |
| 2001/0049695 A1 | 12/2001 | Chi et al. |

* cited by examiner

INTERACTIVE GENERATION OF GRAPHICAL VISUALIZATIONS OF LARGE DATA STRUCTURES

FIELD OF THE INVENTION

The invention is directed to a method and system for visualization of information stored in a database, such as log files, customer databases, statistical data sets, and more particularly to graphically rendering such information with a high degree of flexibility to extract associations between database records.

BACKGROUND OF THE INVENTION

The recent explosive growth of information storage and retrieval creates challenges for extracting meaningful information from large datasets of often seemingly unrelated information. Early methods of representing the information include scatter plots, bar graphs, pie charts, colored maps, tree structures and the like. For example, Microsoft® Excel™ enables viewing a data set as a table or as a chart, Spotfire and eBiz as interactively adjustable 2D and 3D scatter plots or in a parallel coordinate system; Inxight Eureka displays them in a table where numbers are replaced by small bars of length proportional to the value held in the cell. These products, as well as known research prototypes, such as Treemaps, The Influence Explorer or the Prosection Matrix are directed to a limited number of visualization types that are mapped from a data table to a set of graphic attributes. While those products allow customization, such as choosing the scale factors on a scatter plot, choosing the ordering of the columns, or choosing which values of the data are to be mapped onto the axes, none allows interactive browsing of the available space of the visualizations by adjusting a limited number of parameters.

It would therefore be desirable to provide an interactive editor that produces a class of visualizations that can be rendered in real time and thereby remain efficient even for large datasets.

It would further be desirable to provide a simple, but highly flexible user interface for accessing the available visualization created in this way.

SUMMARY OF THE INVENTION

The methods and computer-embodied programs described herein for graphically rendering, through visualization, data sets, in particular data contained in a table format, include a visualization-generation process having as input a style-sheet (representing the visualizations' description) with a set of parameters and a data table. The style-sheet will be referred to hereinafter also as a list of ETALV (Expression of Table Attributes And Local Variables). The process is designed to render those visualizations that can be rendered in a time that is a linear function of the number of records. This group of visualizations will be referred to hereinafter as "Compact Visualizations". Compact Visualizations can be rendered with a small number of parameters which greatly enhances the flexibility of the described visualization process.

According to one aspect of the invention, visualization of records arranged in a data table having columns and rows involves using a graphic user interface (GUI) to interactively set visualization parameters (ETALV) for the records of the data table. Those records of the data table that have a common ETALV value can then be clustered, and the records and the clusters of records are then sorted in a predetermined order which can also be set by the ETALV's. Based on the selected ETALV's for the record or the cluster of records, a geometric attribute primitive is associated with the record or the cluster of records, and a graphic attribute primitive is associated with an associated geometric attribute primitive. The records or the clusters of records having the associated geometric and graphic attribute primitives are then graphically rendered.

Embodiments may include one or more of the following features. Each ETALV operates on a single record of the database. In this way, the records or the clusters of records can be graphically rendered in a time that is substantially a linear function of the number of records in the data table. The geometric attribute primitives can include a position, a size, and a shape pattern of an element of a visualization, wherein the shape pattern can be rectangles, polygons, ellipses, and text, as well as other suitable custom shapes. The graphic attribute primitives can be color, pattern, font, and/or line width, by may also include shading, illumination effects, and the like. The visualization parameter structure can be organized as a hierarchical structure that includes sub-visualizations capable of rendering selected clusters.

Specific embodiments may include Gantt charts, histograms and 2D- and scatter plots, tree structures, regular tables, as well as combinations, such as a series of histograms laid out as a Gantt chart or presented in a table, a 2D plot of tree nodes, and the like.

The methods and programs described herein are also directed to computer programs with computer-executable code to provide a versatile and flexible user interface for generating visualizations in the manner described above.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN EMBODIMENTS

Figure 1:
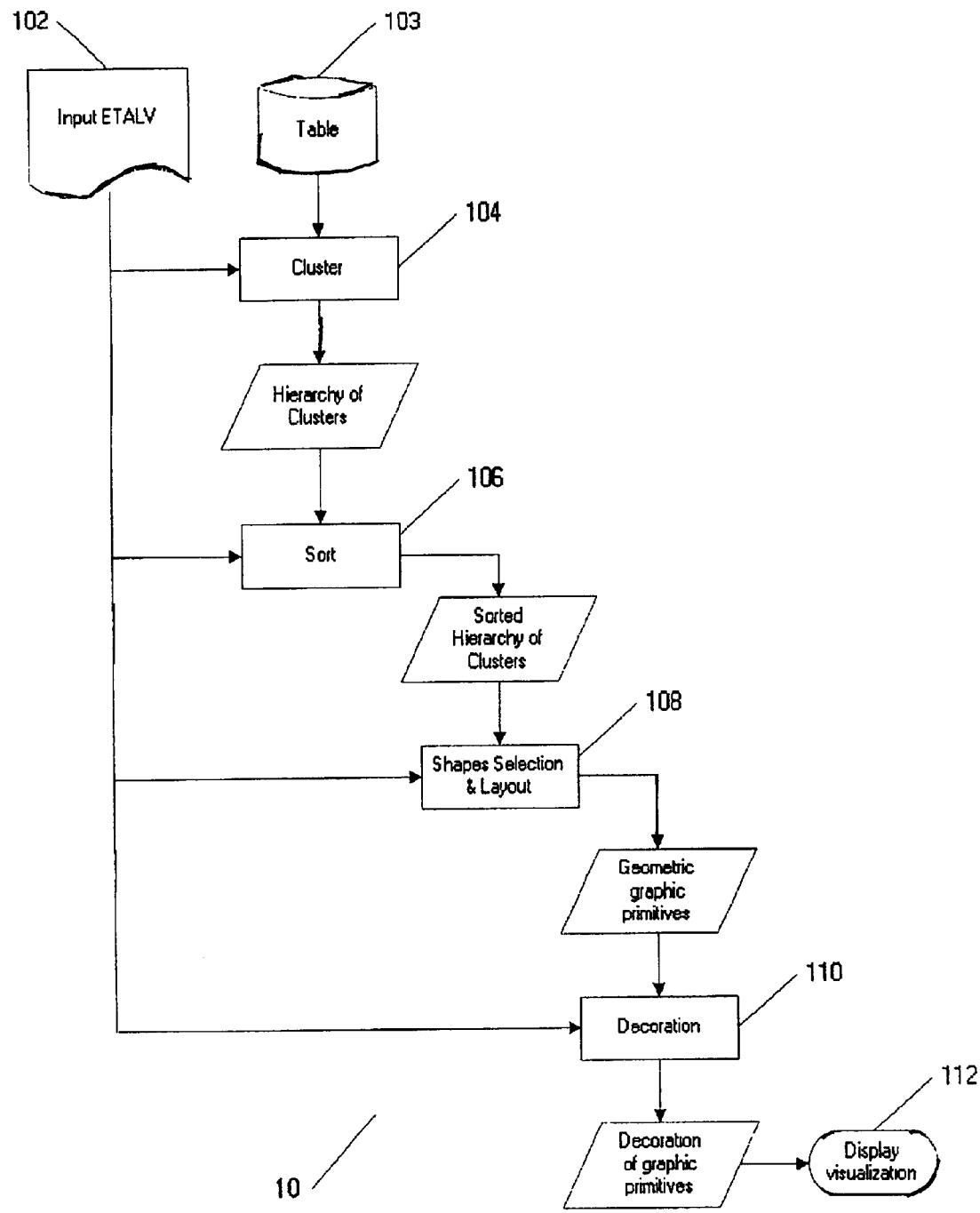
FIG. 1 is a schematic flow diagram of the visualization-rendering process of the invention.

A method and computer-executable program is described for graphically rendering information of a database which can be arranged in form of a table, and for extraction associations between database records. An element and/or an arithmetic expression computed from the records in the database can be associated with a graphic representation consisting of instructions, such as setting a fill color, drawing a rectangle, and so on. The proposed visualization-rendering method is computationally fast, since at most O(N) graphic instructions need to be generated for a database of N records.

The following exemplary definitions refer to terminology used throughout the specification:

Data Table—a data set organized in a matrix of rows and columns. The columns are referred to as attributes of the data set. Each column can have a header, a type, and additional properties, such as the format in which the data is stored and whether the column is to be cumulated or averaged when a set of records is aggregated in a group. An instance of the data table has an arbitrary number of lines, often called records, or data objects. For each column, each line has an attribute value that describes the value of the given line for the given column. A data table can also be a table in a relational database.

Graphic Language—A graphic language is a set of programming language functions and data types (i.e. a library) that enable describing images on a computer screen, printer, or other computer-driven image-producing device. Modern graphic languages, such as OpenGL, Postscript, Microsoft® GDI, Java2D and Java3D consist of two types of functions, geometric attribute primitives and graphic attribute primitives:

Geometric Attribute Primitives—describe shapes to be rendered on the screen using Graphic Languages. Examples of geometric attribute primitives are: drawRectangle (x, y, w, h), drawIcon (bitmap, x, y), drawLabel ("hello", x, y). Geometric attribute primitives also have positional parameters, for example, drawRectangle (0,0,120,120) which will draw a rectangle at the origin of the display (0,0) spanning 120 pixels in both width and height.

Graphic Attribute Primitives—describe graphic attributes, such as color, font, and pattern, that are used in drawing the associated geometric attribute primitives. For example, setColor("red") followed by drawRectangle(0, 0,120,120) will result in a red rectangle being drawn at the coordinates(0, 0, 120, 120). setColor( . . . ) can have more than one, for example three parameters that describe the RGB color space. It should be noted that there is at most one graphic attribute primitive of each sort being issued between two geometric attribute primitives.

Visualization—of a data table is a program, that, given as input any instance of the data table, outputs a uniquely defined sequence of graphic language instructions.

Representation—a representation of a data table is the output of a visualization given a data table instance as entry. It consists of a sequence of graphic language instructions only.

Expression of Table Attributes—is a sequence of programming language instructions that consists only of: constants, programming language operators (including functions), and data table attribute names. The attribute names stand for variables that, for each row of the column, will take the value of the current record for the current attribute.

Local Variable—a variable of the programming language that is reevaluated once for each record in the data table instance and stored as each record is examined sequentially. Local variables store some state information that can be used, for example, to draw records next to or on top of each other.

Expressions of Table Attributes And Local Variables (hereafter referred to as "ETALV") are the parameters of the visualization description method and include the aforementioned expression of table attributes and optionally local variables.

It should be noted that the time for computing an ETALV is independent of the number of records held in the table, because the ETALVs do not include instructions that operate on more than a single record at a time. Furthermore, table attributes and local variables need be computed only once for each record and can be cached in an array the size of the data table instance.

Compact Visualization—Compact Visualizations are defined as those visualizations in which the graphic instruction sequence corresponding to any given data record or group of records is completely defined by a sequence of ETALV's. Those ETALV's are the parameters of the visualization-generating algorithm described below. A compact visualization can be rendered in time directly proportional of the number of records held in a table instance, plus a sorting phase, which according to generally accepted criteria has a complexity of O(n log n) in time, with some other methods purportedly sorting at O(n).

A Compact Visualization includes three distinct steps: (1) CLUSTER & SORT; (2) SHAPE SELECTION & LAYOUT; and (3) DECORATION.

In general, the invention is directed to a method and a computer-implemented program for describing and then rendering compact visualizations. Those provide a graphic layout of information contained in large databases that allows a user to visually establish correspondences, find useful patterns, highlight trends in the datasets, and the like. The proposed method is efficient and can be customized depending on the application.

Referring now to FIG. 1, the method for compact visualizations is depicted in a schematic high-level process flow diagram 100. The various steps of the process flow will be described in more detail below in the exemplary pseudocode and with reference to FIGS. 2 and 3. In step 102 of FIG. 1, a user defines Expressions of Table Attributes And Local Variables (ETALV) to be applied to the compact visualization of records stored in table 103. Examples of ETALV's are described below with reference to FIG. 3. In step 104, the records are "clustered" into a hierarchy of clusters, whereby the data are organized in groups that share a common representation defined by the ETALV parameters of step 102. Thereafter, the data objects are sorted, step 106. Sorting is done after clustering, so that sorting is performed on smaller lists, resulting in significant optimization. In Shapes Selection & Layout, step 108, one or more graphic primitives (such as a rectangle, a line, etc.) and the coordinates of these primitives are associated with the data objects and/or groups of the sorted hierarchy of clusters. In a final step 110, the produced geometric graphic primitives are decorated, for example, by specifying a color, shading and the like, and the decorated graphic primitives are displayed, step 112. As mentioned above, the parameters used in the various steps are defined in the ETALVs.

An instance of the class Visualization is defined by the ETALV parameters that describe a compact visualization. For each of those parameters, the user provides an Expression object that contributes to the definition of the visualization algorithm. The main function of the Visualization class is a function draw(Table, Frame).It contains further objects that detail how each step is to be performed:

```
        class Visualization {
            Identifier id;
            List of Variable __variables;
            Clusterer __clusterer;
            Sorter __sorter;
            Layout __layout;
            Decoration __decoration;
            List of Visualization __subVisualizations;
            List of pair<Identifier, Table> __clusters;
            function draw(Table, Frame);
        };
```

The Visualization-rendering algorithm can be expressed in pseudocode as follows:

TABLE 1

```
200    Visualization::draw(Table t, Frame f) {
204        __clusterer.initialize(t, this);
206        sorter.sort(__clusters, this);
208        for each variable v in __variables
               v.initialize(t, this);
210        for each pair<Identifier,Table> i in __clusters {
               Visualization curViz =
212               __subVisualizations.find(i.identifier);
214            if (curViz ==null) curViz = this;
216            for each graphic shape g in curViz.__layout {
218                curViz.__decoration.draw(i.table, curViz);
220                g.draw(i.table, curViz);
               }
222            curViz.draw(i.table, f);
224            for each variable v in __variables
                   v.incrementVariables(i, this);
           }
       }
```

In the above algorithm, t represents a set of records of the data table; f represents a frame of an object (screen, window); i, j are local counters; and CurViz is the Visualization structure defined by the ETALVs. A visualization-rendering process assumes that the screen has been cleared before starting, and starts by setting the counter i=0. Before describing the Clusterer, Sorter, Layout, and Decoration classes in detail, the concept of expressions and local variables is introduced.

The class Expression:

```
        class Expression {
            Object evaluate(Record r, Visualization v);
        }
``` is used to parameterize each of the Clusterer, Sorter, Layout and Decoration classes. It is the implementation of an ETALV as defined above. The evaluate function can be defined by the user to return any object of the language, and it can perform any type of computation allowed by the program, using the values held in the r (Record)—attributes and v (Visualization)—variables. The present implementation provides a simple and convenient expression parser that allows the user to define expression such as a sum of columns, a constant or any simple numeric expression of the language.

In addition, the real Expression class is enhanced with the ability to synthesize a value for a group (a sub-table) of records. Accordingly, a Synthesizer class is added as follows:

```
        class Expression {
            Object evaluate(Record r, Visualization v);
            Object evaluate(Table t, Visualization v) {
                Synthesizer.evaluate(c, this, v);
            }
            Synthesizer synthesizer;
        }
        class Synthesizer {
            virtual Object evaluate(Table t, Expression e,
        Visualization v);
        }
        class SumSynthesizer implements Synthesizer {
            Object evaluate(Table t, Expression e, Visualization v) {
                Integer result=0;
        // computes the sum of the values of expression e for the
        // whole table
                for each record r in t {
                    result = result + e.evaluate(r, v);
                }
                return result;
            }
        }
        class MinSynthesizer implements Synthesizer {
            Object evaluate(Table t, Expression e, Visualization v) {
                Integer result=MAXINT;
        // computes the minimum value of expression e for the
        // whole table
                for each record r in t {
                    Integer temp=e.evaluate(r, v);
                    If(temp<result) result=temp;
                }
                return result;
            }
        }
        // and so forth for Max, average, or
        // other statistical moments: median, interval...
```

The synthesizer class returns a condensed single value reflecting the values held in the sub-table. Because different types of attributes may have to be synthesized differently, a number of predefined synthesizers is provided, and users can add their own. For example, in a computer file system, file sizes are additive attributes, as are, in the exemplary database of cities used below, Populations. This means that the size of a group of files is the sum of their individual sizes, or that the Population of a table of cities is the sum of their populations. Not all attributes are additive. For example, if the attribute is the creation date of a file, then the creation date for a table of size is the minimum date of all creation dates. For a last modification date, it is the maximum value of all modifications date (i.e. the latest date of all records held in the table). If no synthesizer is provided by the user, the values of the expression for each record are averaged. Therefore, an expression can be evaluated in the same way, interchangeably either for a single record or for a table (or sub-table) of records. As mentioned before, a visualization can define local variables.

These are defined in the class Variable:

```
        class Variable {
            String name;
            Expression initExpression;
            Expression incrementExpression;
            Object currentValue;
            Object getValue( );
            void initialize(Table t, Visualization v) {
                currentValue=initExpression.evaluate(t, v);
            }
```

```
-continued void increment(Record r, Visualization v) {
        currentValue=incrementExpression.evaluate(r, v);
    }
}
```

This class implements the definition of Local Variable defined above. The variables are defined by the user, who gives them a name, that will be used in Expression objects to access their current value, an initial expression that is evaluated to give the expression a default value at the start of each visualization-rendering process (step 208 of Table 1), and an incremental expression that is evaluated once for each record or group of records that the visualization process handles (after step 224 of Table 1).

Figure 2:
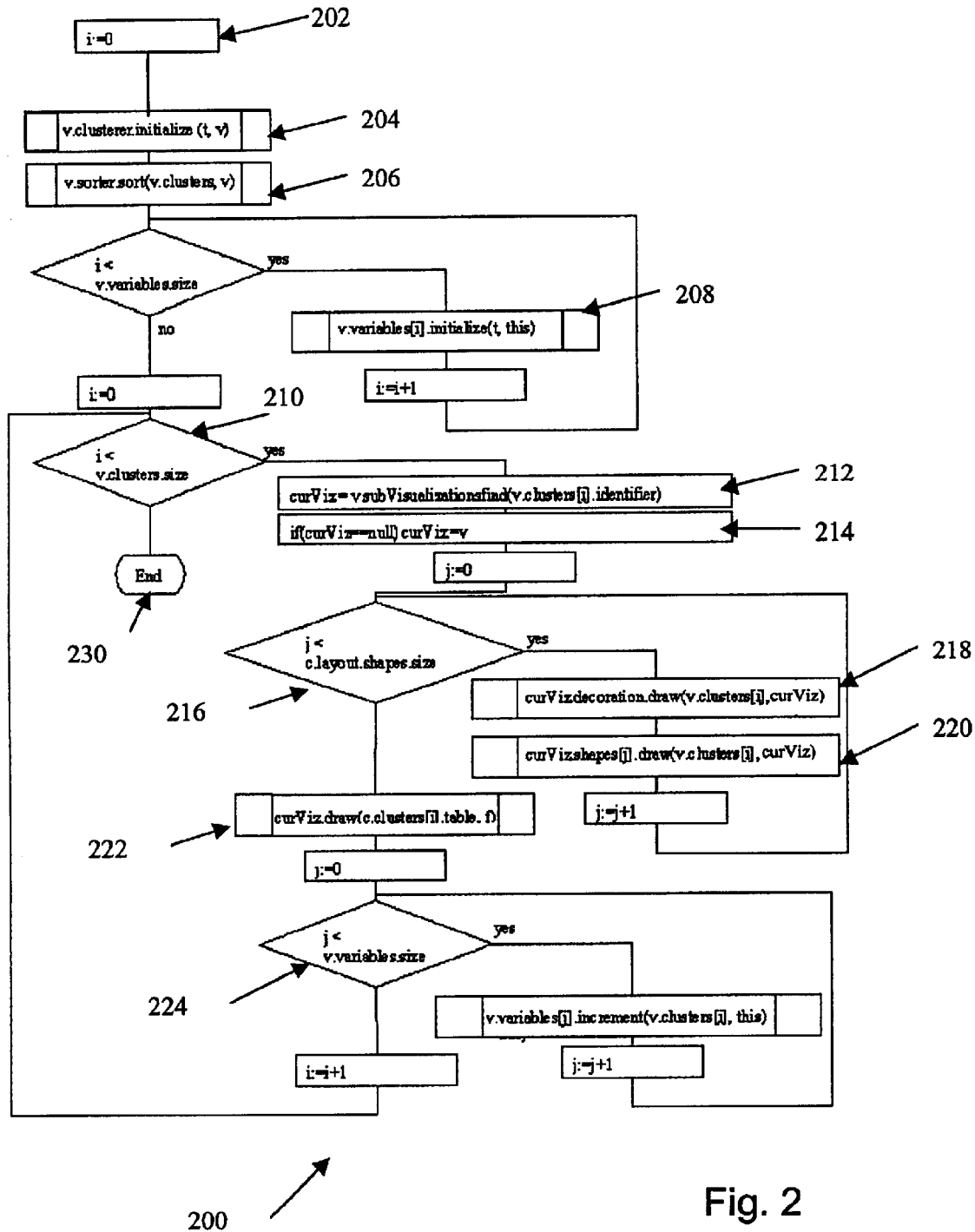
FIG. 2 is a more detailed description of the algorithm used to render visualizations, presenting FIG. 1 as an algorithm rather than a flow diagram.

Referring now to FIG. 2, for a better understanding of the visualization-rendering algorithm, the pseudocode commands of Table 1 are illustrated in form of a flowchart 200, with the reference numerals in the flowchart 200 having a one-to-one correspondence to the pseudocode commands. A visualization-rendering process starts by setting the counter i=0, step 202. In step 204, the records of the data table instance that share a common representation and common local variables are "clustered" or grouped/aggregated based on a set of local variables and graphic primitives that are to be shared among one or several groups of records of the table. To preserve the linear rendering time constraints characteristic of compact visualizations, the clustering process represents a partitioning operation, that is, a given record belongs to one and only one cluster.

A class Clusterer is defined to perform the operational step 204 of clustering records into groups of records:

```
class Clusterer {
    Expression tableExpression;
    function initialize(Table, Visualization);
    function Identifier cluster(Record r, Visualization v) {
        return tableExpression.evaluate(r, v);
    }
}
``` with the function initialize defined as follows:

TABLE 2

```
300    Clusterer::initialize(Table t, Visualization v)
       {
302        v._clusters.clear( );
304        for each record r in t {
306            Identifier i = cluster(r, v);
308            pair<Identifier, Table > current_cluster
                   = v._clusters.find(i);
310            if (current_cluster == null) {
312                Table sub-table=new Table( );
                   sub-table.add(r);
                   current_cluster=new pair<i, sub-table>;
314                v._clusters.add(current_cluster);
316            } else current_cluster.add(r);
        }
       }
```

Table 2 represents the pseudocode of the clustering process, which involves splitting a table into a group of smaller tables or individual records that each share a common property. The process takes as input a table t, a Visualization v (to enable accessing the local variables it defines) and a clustering expression, here implemented as the cluster subroutine.

The clustering process 300 starts by erasing any cluster that could have been stored in the table of sub-clusters, line 302. Then, for each record held in the table t, the cluster function is called to evaluate in which class the record should belong, line 306. In line 308, the table of sub-tables held in v is examined if there is a sub-table existing for this identifier. If there is none, line 312, a new sub-table associated with identifier curId is added. Then, line 314, the current record is added to the corresponding sub-table. The process 300 is executed for each record held in Table t by returning to line 304. This process results in Table t being divided in a series of sub-tables, each identified by an identifier Id and stored (cached) in the Visualization data structure.

The identifier CurId returned by the cluster routine and used to define each record's class is provided by evaluating the user-defined ETALVs. Examples of clustering are grouping data according to the prefixes of a string of characters held in an attribute (StringClusterer), or according to a date attribute (DateClusterer), for example, year, month, day, hour, and minute. As mentioned in the description of the class Expression, each cluster can be seen as a record whose values are synthesized from the records it holds. For each attribute of the data table, one can specify how the records are to be aggregated when the records are grouped. Typically, sizes are added; the starting date of a cluster of records is the minimum of the starting dates of its records, a numerical quantity can be synthesized by the average (arithmetic, geometric, or harmonic) of its values. Default classes are provided for commonly used ways to aggregate a set of records into one single cluster to be viewed as a record. The number of records that can be aggregated is variable.

For example, a function StringClusterer would be defined as follow:

```
class StringClusterer extends Clusterer {
    Expression stringExpression;
};
Identifier StringClusterer::cluster(Record r,
                                    Visualization v) {
    // stringExpression simply returns the string held in r.
    return stringExpression.evaluate(r, v);
}
class DateClusterer extends Clusterer {
    Expression dateExpression;
};
Identifier StringClusterer::cluster(Record r,
                                    Visualization v) {
    /*
    dateExpression is an ETALV that returns the year held in r
    when v is empty, the month held in r when the list of sub-
    expressions is a list of months, and so forth for day,
    hours, minutes and seconds.
    */
    return dateExpression.evaluate(r, v);
}
```

A special Clusterer type could be implemented to cluster records together not according to some endogenous property, but using exogenous variables, wherein the placement of the sub-clusters is determined heuristically. This could be used, for example, to implement features such as 'squarified treemaps,' which does not represent a true compact visualization. Valid representations may still be produced, however with a reduced efficiency.

After computing the clusters, but before shape selection and layout, the clusters and records are sorted in a desired order, step 206, for example, according to the value of attributes in a data table. The following exemplary program sorts a table according to an attribute of the data table.

```
class Sorter {
    Expression numericExpression;
    Visualization current_visualization;
    function int compare(Record a, Record b);
    function sort(Table t, Visualization v);
}
int compare(Record a, Record b) {
    return
        numericExpression.evaluate(a, current_visualization) -
        numericExpression.evaluate(b, current_visualization);
};
Sorter::sort(Table t, Visualization v) {
    current_visualization=v;
    quicksort(t, compare);
}
```

Quicksort is a sorting algorithm, for example, the algorithm defined by Hoare in 1962 and available in most programming languages: Java, C++, etc. Quicksort uses the function compare as a comparison function and is not linear in time, but sufficiently efficient to be useful with compact visualizations. Alternatively, a "radix" sort technique known in the art could be employed to further optimize the process and provide a linear rendering time.

After initializing each variable v, step 208, and defining the current visualization as expressed by the visualization parameters, step 212, the Shape Selection & Layout process assigns one or several geometric attribute primitives, such as shapes, to a record or cluster of records, steps 214 and 216. These shapes can include, for example, rectangles, text labels, lines, segments of arcs, and other geometric attribute primitives, such as disk portion primitives suitable for circular and pie charts as well as line primitives, to enable regular line charts as well as construction of objects by straight lines, such as rectangles, polygons, and Bezier curves.

For each assigned primitive, a DECORATION process, step 218, sets certain graphic attributes for each record being drawn. Such attributes can be color (expressed in RGB, CYM, etc.), patterns, transparency, light coordinates used in certain illumination models described by 3D graphic languages, such as OpenGL and Java3D, line bevel properties, line thickness, and so on. Additional parameters can specify margins, borders, scale, ruler information, and the position of text labels relative to the center of the geometric attribute primitives. In the described process 200, the decoration phase is shown as being implemented after the layout phase, since each primitive shape generated by LAYOUT process is determined before being decorated. Thus, decoration is specific for the layout and shape selection. However, those skilled in the art will appreciate that the order in which the steps are performed need not be the same as the order of the logical dependencies between process steps.

The following program defines a Color Decoration class:

```
class ColorDecoration extends Decoration {
    Expression redComponent;
    Expression greenComponent;
    Expression blueComponent;
    function draw(Record r, Visualization v) {
        setColor(redComponent.evaluate(r,v),
            redComponent.evaluate(r,v),
```

```
        redComponent.evaluate(r,v));
    }
};
```

A composite decoration enables condensing multiple decoration attributes:

```
class CombinedDecoration extends Decoration {
    ColorDecoration color;
    PatternDecoration pattern;
    function draw (Record r, Visualization v) {
        color.draw(r, v);
        pattern.draw(r, v);
    }
};
```

As mentioned above, depending on the power of expression of the graphic language, various other parameters can be used as decorations, such as transparency, light coordinates, line bevel properties, line thickness.

The Layout step 220 includes assigning parameters to each of the graphic primitives representing a record or a cluster. A parameter can be unspecified, in which case this dimension will be maximized, or it can be an expression of table attributes or local variables.

Exemplary layout shapes are rectangles and text. A layout class for rectangles can be defined as:

```
class RectangleLayout {
    Expression x;
    Expression y;
    Expression width;
    Expression height;
    function draw(Record r, Visualization v) {
        fillRectangle(x.evaluate(r, v),
            y.evaluate(r,v),
            width.evaluate(r, v),
            height.evaluate(r, v));
    }
}
```

Text labels have a further "label" parameter. The most obvious assignment of this parameter is to assign it an attribute name, such as the city name in our sample table data.

```
class TextLayout extends RectangleLayout {
    Expression label;
    function draw(Record r, Visualization v) {
        super.draw(r,v);
        setColor(0,0,0); // black.
        // Additional customization can be provided to allow the
        user
            // to choose a text color.
            drawLabel(label.evaluate(r,v),
                x.evaluate(r,v) + 2,
                y.evaluate(r,v) + 2);
    }
};
```

It will be understood by those skilled in the art that a layout with several geometric attribute primitives can easily be derived from the above classes. A list of layouts and decorations, one for each attribute of the data table, is maintained for each record that is to be drawn, step 216.

In step 224, local variables are evaluated once for each record or cluster of records to be rendered. These user-defined local variables often define a current position that is initialized to "0" and incremented by a height (to arrange objects in rows) or a width (to arrange objects in columns) of each record or cluster.

The visualization-rendering process is recursive, as described above with reference to steps 212–222, i.e., a cluster can be further partitioned into sub-clusters that group together records sharing some common display properties. As seen in step 212, the visualization can describe different representations at each level in the hierarchy: a visualization data structure is a hierarchy that can describe sub-visualizations that will be used to render selected clusters. By default, step 214, all levels of sub-clusters use the same visualization.

The invention will now be described with reference to several screenshots illustrated in the drawings.

To provide an exemplary database, statistical data from approximately 300 US cities were gathered and arranged in a table format. Each city is referenced by city name, state, population, longitude, latitude, a case and study numbers (an identifier referring to the origin of the data) as well as the following numerical attributes expressed in relative numbers: climate, housing cost, quality of health care, crime rate, transportation, quality of education, arts, recreation and strength of the economy.

Figure 3:
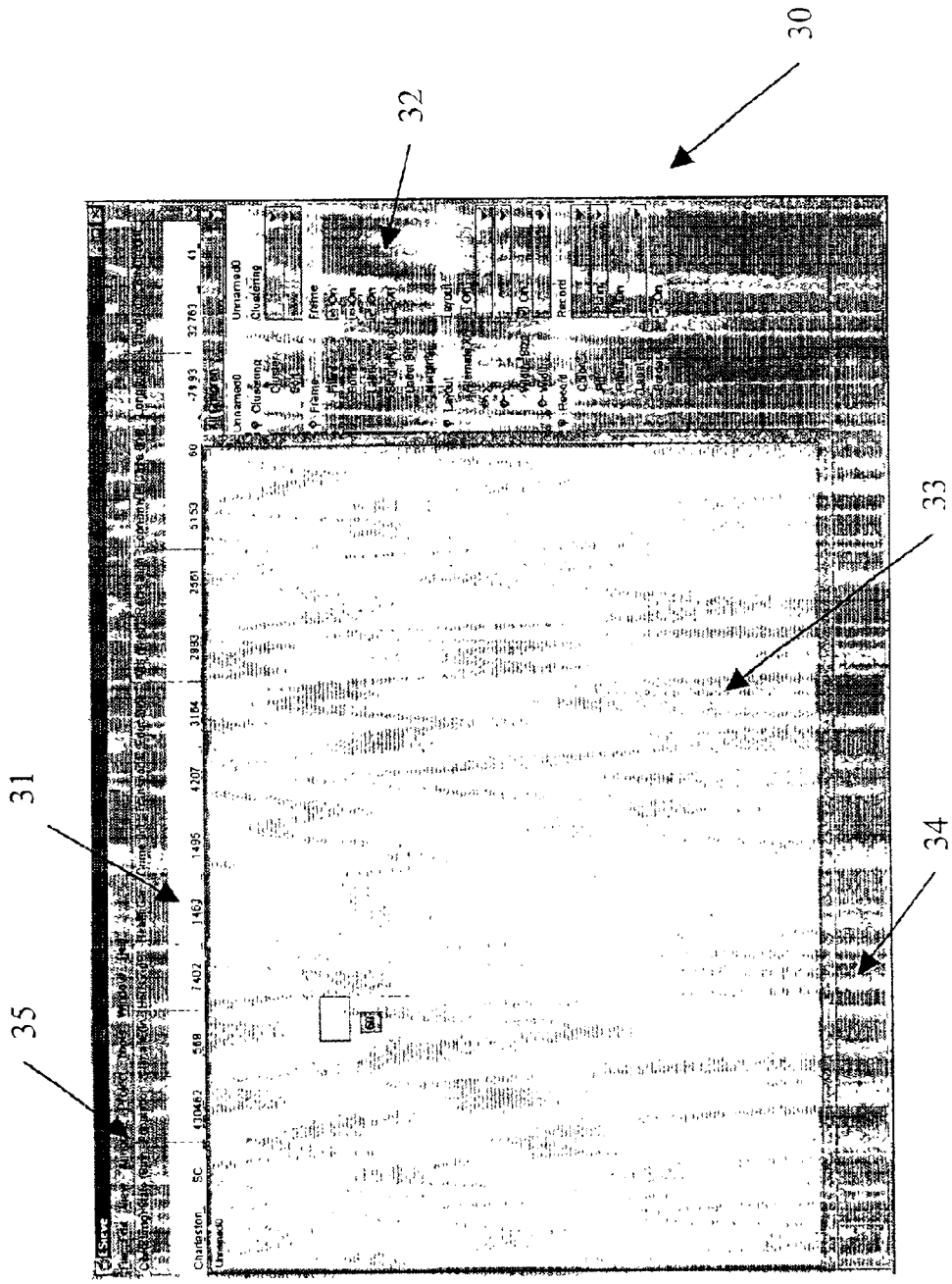
FIG. 3 is a screen shot showing an exemplary organization of a display window.

Referring first to FIG. 3, after the application program is started, a graphic user interface (GUI) 30 shows several windows 31, 32, 33, 34, and 35 allowing a user to manipulate data of the database table and display them using various visualizations. Window 31 is referred to as "Model Inspector", which displays at least one row of the columns in the data table to be visualized. Window 32 is referred to as "Projection Inspector", which displays the various parameters that can be set to create a visualization, as well as their current settings. Window 33 is referred to as "Data Table View", which displays the representation of the data table in window 31, according to the visualization parameters specified in window 32. As can be seen from a closer inspection of window 32, the window 32 includes the fields "clustering", "sorting", "shape selection" (frame), "layout" and "color" and "fill" (decoration) that are the necessary steps defining a compact visualization, as described above. The user can select the table attributes and local variables (ETALV) by changing the settings of these parameters in window 32, thereby allowing in a simple manner a change in the displayed representations. As can be seen from the settings in window 32 depicted in FIGS. 4–7, all the different displayed representations are rendered by simply changing a few parameter settings in window 32. For usability reasons, the definition of local variables is hidden in the graphical user interface; those are replaced by preset buttons, such as the "alternate X/Y" button, that define often used variables. This is illustrated later, in FIG. 6. The full features are available in the text-based style sheets generated by the "projection inspector".

Window 34 is referred to as "Shelf". In this window displays in form of icons other visualizations of the same data table. These other visualizations can be recalled by clicking on the corresponding icon. Also provided are menu bars 35 that allow manipulation of the various windows, loading and storing of visualizations, data tables, cut/copy/paste operations and so forth. Many of these features are known from standard GUI interfaces. In one embodiment, a parameter in window 32 is selected and assigned a column name of the data table, or an arithmetic expression computed from arithmetic values in some of the columns. In a simple example, the values in the "Population" column can be associated with the "Color" attribute in window 32, and the items in the table can be sorted by "Population". This assignment of values would fill window 33 with horizontally extending rows of rainbow colors that are stacked in the vertical direction, thereby filling the window 33.

Figure 4:
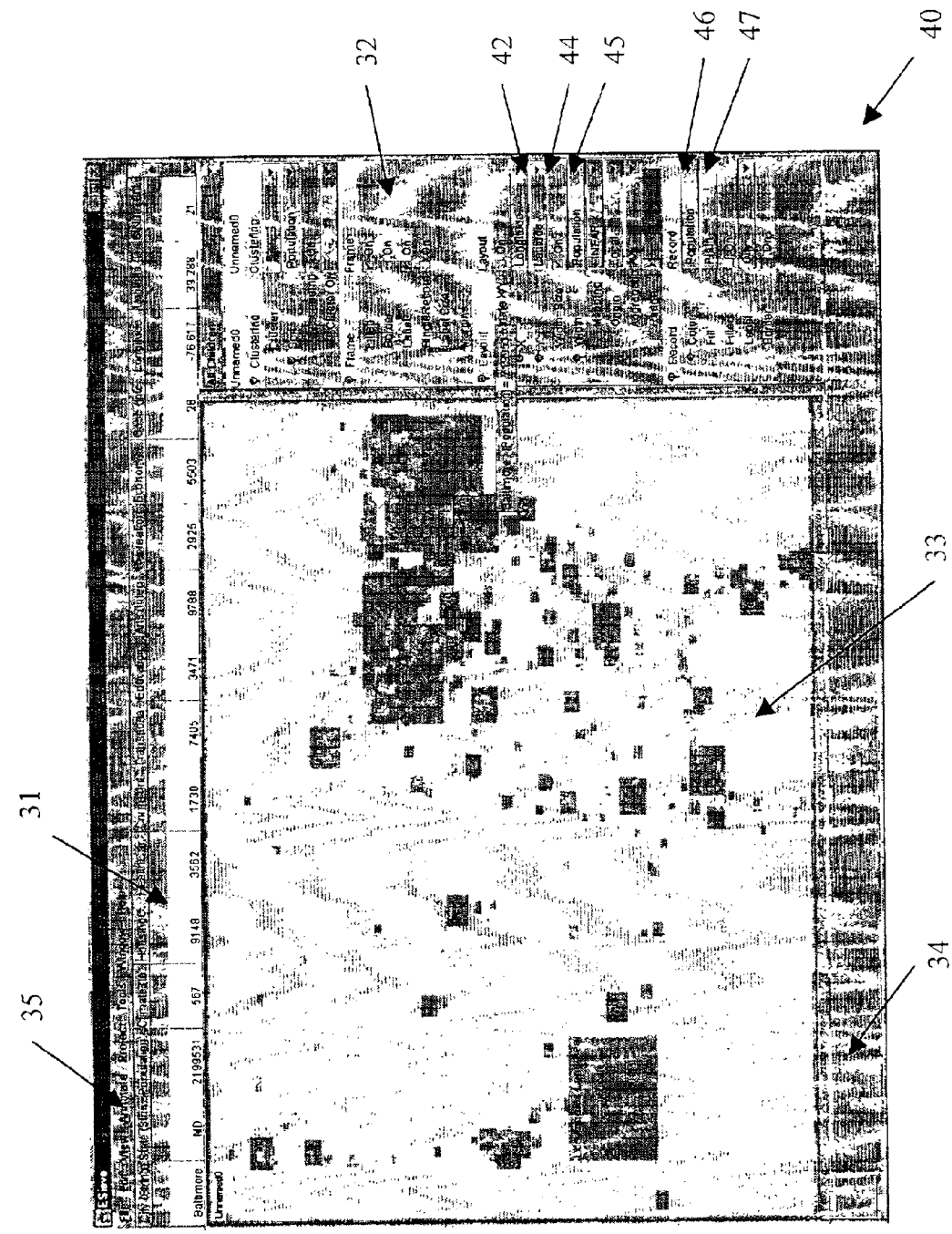
FIG. 4 is an exemplary representation of a population map.

Another exemplary display 40 in form of a scatter plot using the same database as before is depicted in FIG. 4. In the initial step, the X coordinate 42 is assigned to the "Longitude" table attribute of the cities and the Y coordinate 44 to the "Latitude" attribute. This produces a 2D scatter plot of the cities on a map of the United States. Both the "Size" attribute 45 and the "Color" attribute 46 are set to "Population". The "Fill" attribute 47 is set to "Plain". Representations of this type are known in the art. However, as described above with reference to the data displayed in window 31 of FIG. 3, each city or area (and for the same reason each attribute in the table) has associated therewith other values, such as climate, housing cost, quality of health care, crime rate, transportation, etc., which can also be efficiently rendered graphically.

Figure 5:
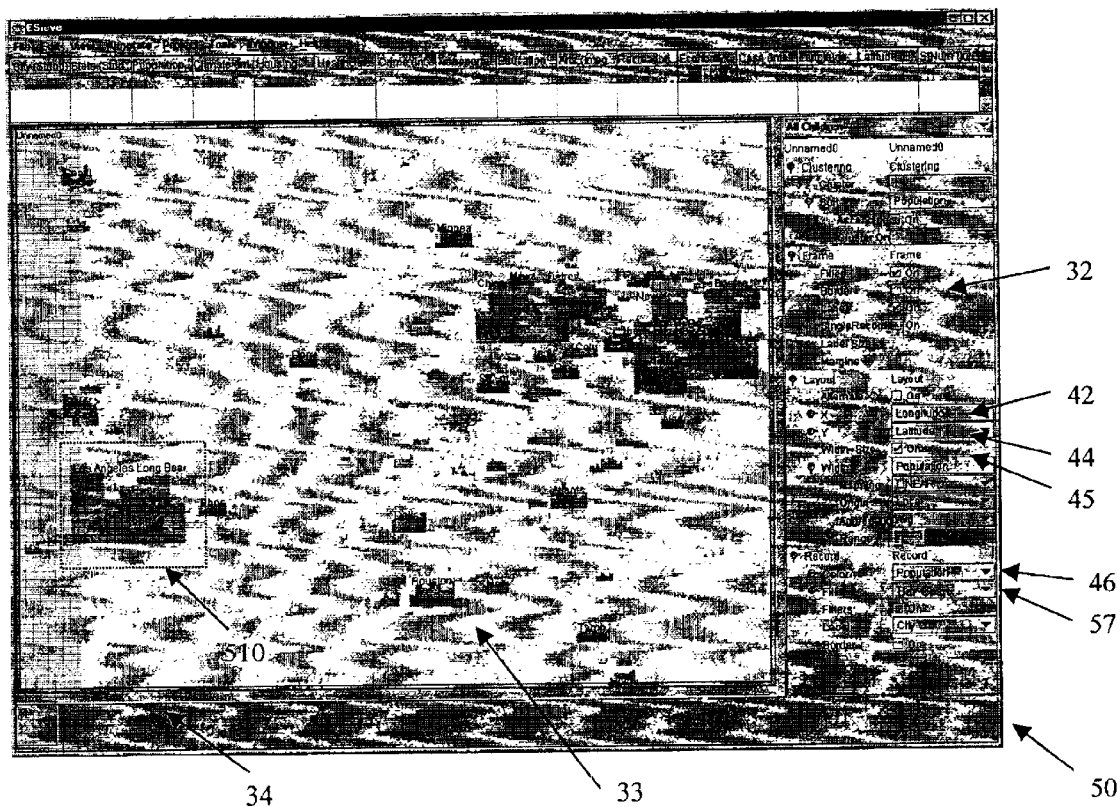
FIG. 5 shows the population map of FIG. 4 with embedded bar graphs.

Referring now to FIG. 5, instead of representing each city by a rectangle with a width corresponding to the population, as previously discussed with reference to display 40 of FIG. 4, according to the invention, display 50 displays a histogram 510 in form of a bar graph for each city or region, wherein the total width of the bar graph represents the population and the height of the individual bars represents other table attributes. The histograms were generated by the application program simply by changing the "Fill" attribute 57 from "Plain" in FIG. 4 to "Bar chart" in FIG. 5.

Figure 5A:
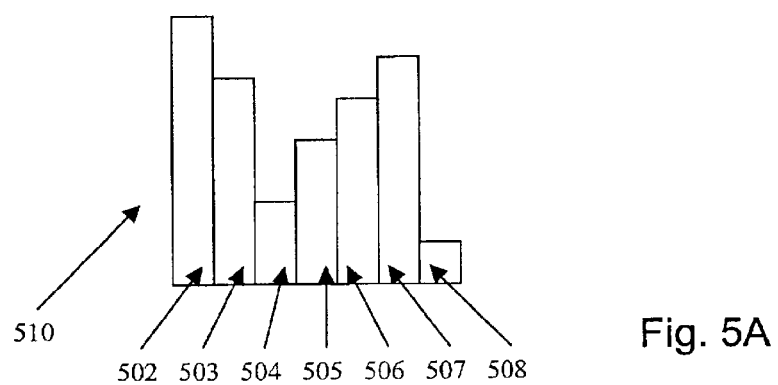
FIG. 5A shows details of the bar graph of FIG. 5.

A detailed view of the histogram 510 is presented in FIG. 5A. The bars 502, 503, . . . , 508 may represent the values of the attributes selected from window 31. It may be possible for a user to click on the histogram to enlarge the scale and/or display the histogram for that city in a separate window (not shown). The display of the histogram is controlled by commands entered, for example, by mouse clicks, in window 32.

Displaying the additionally selected attributes as bar graphs advantageously produces a simultaneous visualization of the database attributes for all cites on the map. This can give an easily recognizable indication as to which cities have better living conditions: those that are close to a full rectangle have better indices for all the above mentioned categories, while those that show big indentations have one or more weak areas.

According to the invention, instead of assigning a single geometric attribute primitive to an attribute, graphic attributes can be recursively assigned to sub-components of an object. Not all visualization attributes need to be assigned to a column of the data model. Instead, they can be associated with an expression of the programming language, which can place them next to each other.

Figure 6:
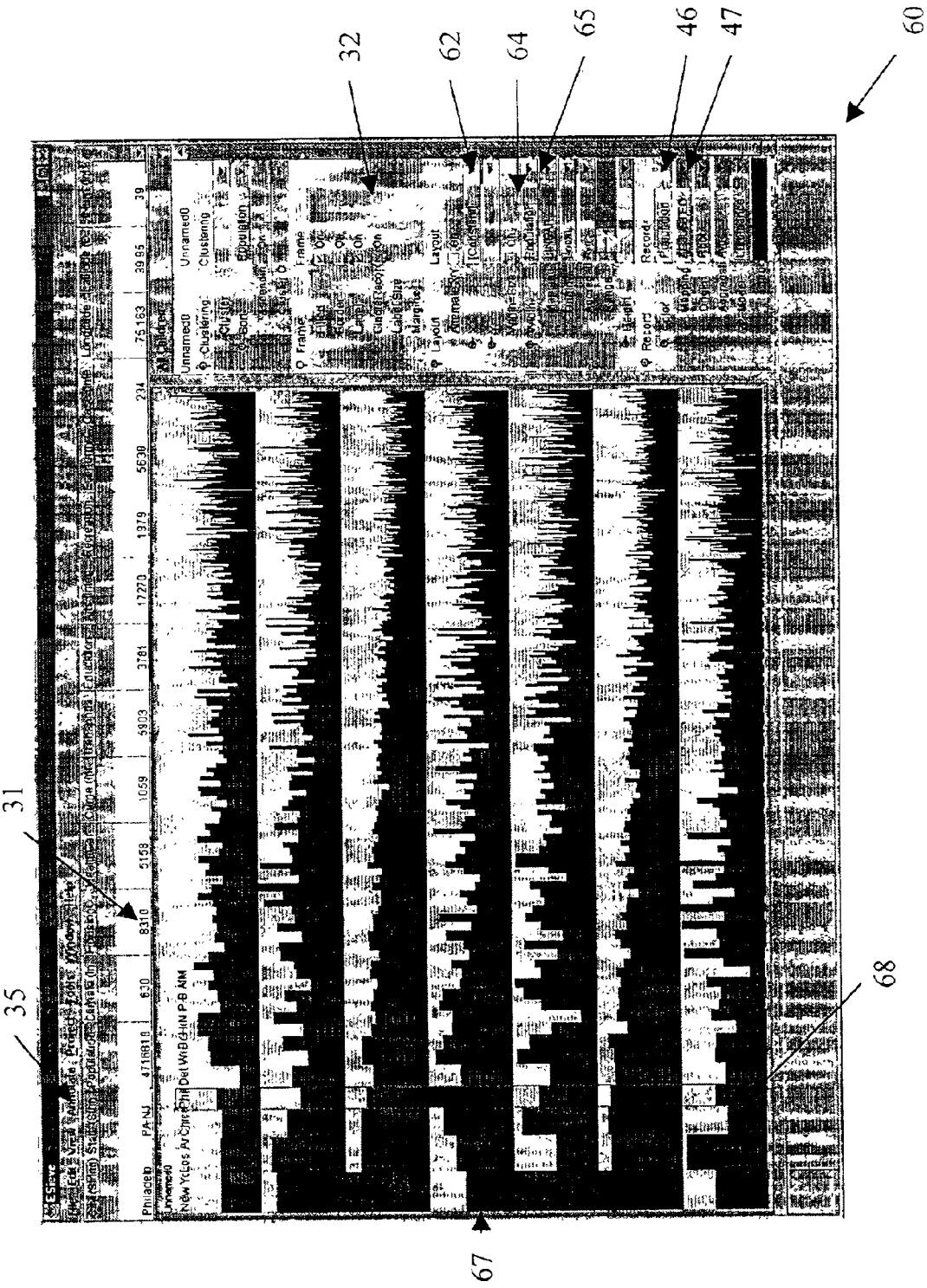
FIG. 6 is an exemplary visualization rendered using the invention, depicting a Bar Chart.

This is illustrated in FIG. 6. In display 60, X 62 is assigned a "Packing" constant, while Y 64 is set to "0" and Height to "1". The "packing" constant in the user interface sets the width to a local variable of value [Population of the Record]/[Total Population for the Cluster] and defines one local variable, curX, that is initialized to 0 and is incremented by width for each record. This has the effect of placing the cities next to each other, ordered by decreasing population. Vertically stacked are the histograms for each record, i.e., climate, housing, health care quality, etc., creating a vertical bar for each attribute in the data table. The displayed width 68 of each bar of the histogram is proportional to the population. This means that the area of each bar (population×attribute index) is proportional to the total number for this table attribute. For example, the "Education" index 67 (height of the bar), shown in the fourth row of FIG. 6, for Philadelphia is greater that of New-York and LA. However, the area under the respective bars for New-York and LA is larger than the area for Philadelphia. So, even though Philadelphia has a larger proportion of students and teachers in its population, NY and LA have a larger absolute student population.

Figure 7:
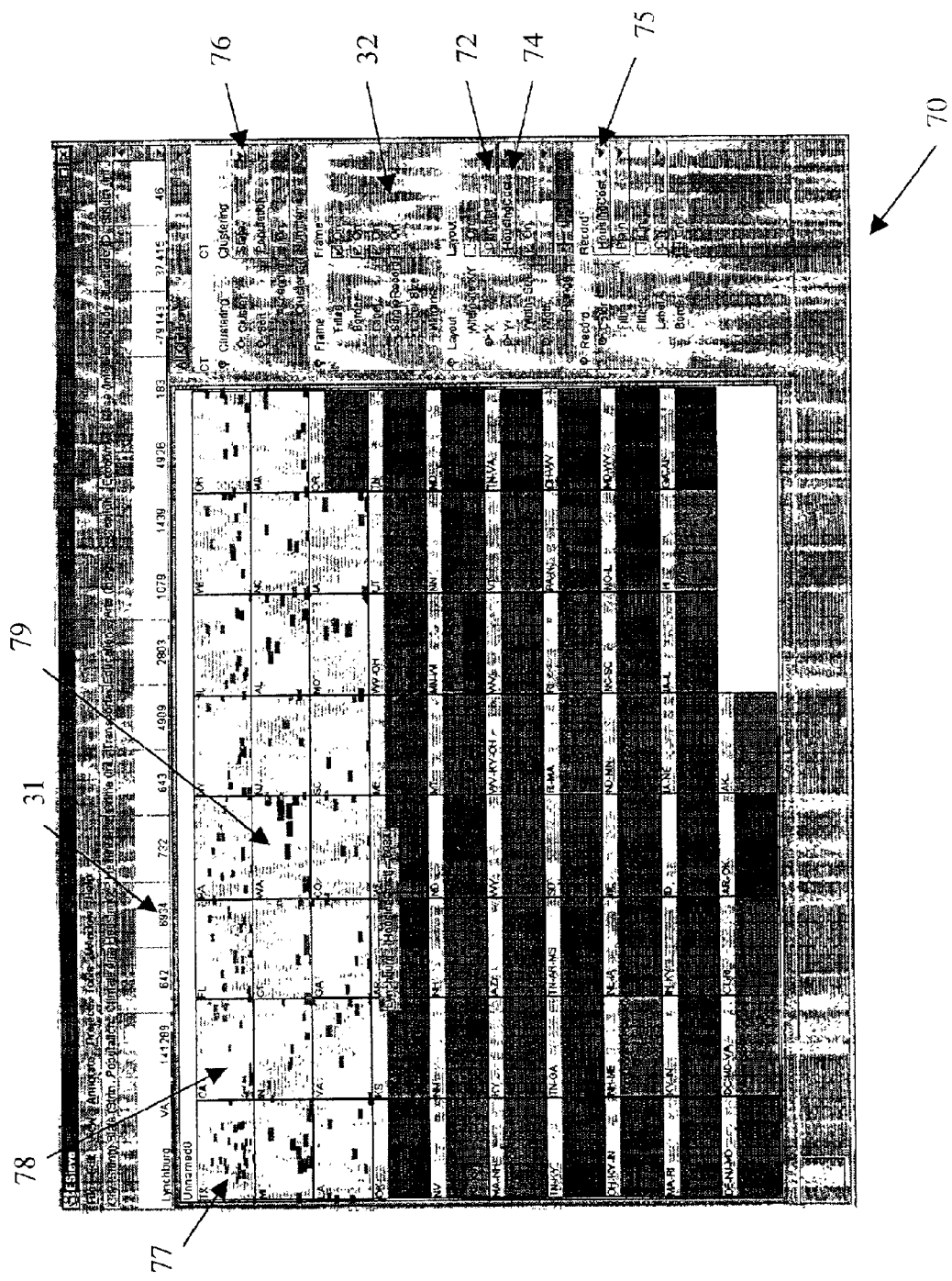
FIG. 7 shows another visualization obtained by sub-clustering the data of FIG. 6.

Referring now to FIG. 7, by selecting a suitable "Clustering" parameter 76, records in display 70 can be grouped and each group rendered using another sub-visualization. For example, FIG. 7 groups (clusters/aggregates) cities belonging to the same State, creating a matrix where each square represents the aggregated value for one State. Different parameters for each group of cities can be specified inside a square. For example, in the small 2D scatter plots 78, 79 in the top three rows, the "Housing Cost" index is plotted against the "Climate" index for each State with more than 4 cities in the sample. This visualization shows some States (California (CA) 78 and Washington State (WA) 79) exhibit a strong correlation between Housing cost and Climate, whereas no such correlation is evident for other States, such as Texas (TX) 77. Different visualizations can be displayed simultaneously, for example side-by-side, in different windows by easy viewing.

In summary, the limited number of parameters in window 32 allows flexibility in moving from one visualization to another. The visualizations are "compact" and can be rendered in a time that depends linearly on the number of records in the database. In addition, a novel recursive model of visualizations within visualizations can be built by "clustering" attributes in the table database. Each cluster can have its own parameter set specifying, for example, layout, decoration, and sorting settings. Therefore, when changing a parameter, the user can specify whether they want the parameter change to be applied to the currently selected cluster and all its sub-clusters or the currently selected cluster only or the direct immediate children of the selected cluster only or the leaf children of the selected cluster only.

Depending on which option has been chosen, visualizations can be created to allow particular clusters to represent their content differently. The disclosed method provides access to all visualizations that can be displayed in linear time, i.e., as a linear function of the number of records in the database.

While the invention has been disclosed in connection with the preferred embodiments shown and described in detail, various modifications and improvements thereon will become readily apparent to those skilled in the art. For example, the disclosed method is not limited by the size of the data structure and could be extended to use data structures other than a data table. Instead of using a list of typed attributes, the data schema could, for example, be a regular XML DTD. Each type of object to be presented would have to be placed, for example, in a predefined cluster. Layout constraints would become much more complex, as the possible visualizations would no longer have a canonical representation. This class of visualizations would be more difficult to customize, and the efficiency of the described visualization method may not be preserved. Accordingly, the spirit and scope of the present invention is to be limited only by the following claims.

I claim:

1. Method for graphically representing records arranged in a data table having columns and rows, comprising:

defining a set of visualization parameters for the data table;

clustering the records of the data table that have a common cluster parameter value in the visualization set of parameters;

sorting the clustered records in a predetermined order defined by a sort parameter value in the visualization set of parameters;

associating a geometric attribute primitive with the record or the cluster of records, said geometric attribute primitive defined by a shape selection parameter value in the visualization set of parameters for said record or the cluster of records;

associating a graphic attribute primitive with an associated geometric attribute primitive of the record or the cluster of records, said graphic attribute primitive defined by a decoration parameter value in the visualization set of parameters for said record or the cluster of records; and graphically representing the sorted records or the clusters of records having the associated geometric and graphic attribute primitives.

2. The method of claim 1, wherein the set of visualization parameters for said records or the cluster of records in the database is arranged in form of a style sheet.

3. The method of claim 1, wherein a visualization parameter of the set operates on a single record or cluster of records of the database.

4. The method of claim 1, wherein the set of visualization parameters comprises parameters selected from the group consisting of a column of the data table, a local variable name, and programming language operators.

5. The method of claim 1, wherein the records or the clusters of records are graphically rendered in a time that is substantially a linear function of the number of records in the data table.

6. The method of claim 1, wherein the geometric attribute primitives are selected from the group consisting of position, size, and shape.

7. The method of claim 6, wherein the shape is selected from the group consisting of rectangle, polygon, ellipse, line and text.

8. The method of claim 1, wherein the graphic attribute primitives are selected from the group consisting of color, pattern, font, and line width.

9. The method of claim 1, further comprising:

selecting clusters from the clustered records;

associating sub-visualization parameters with selected clusters; and performing the steps of associating and graphically rendering on the selected clusters.

10. The method of claim 1, wherein graphically rendering includes displaying visualizations selected from the group consisting of Gantt charts, histograms and 2D- and scatter plots, tree structures, and data tables.

11. Computer program code embodied in a computer-readable medium, comprising:

computer-executable program code for defining a set of visualization parameters for a record of the database arranged in a data table having columns and rows;

computer-executable program code for clustering the records of the database that have a common cluster parameter value in the visualization set of parameters;

computer-executable program code for sorting the clustered records in a predetermined order defined by a sort parameter value in the visualization set of parameters;

computer-executable program code for associating a geometric attribute primitive with the record or the cluster of records, said geometric attribute primitive defined by a shape selection parameter value in the visualization set of parameters for said record or the cluster of records;

computer-executable program code for associating a graphic attribute primitive with an associated geometric attribute primitive of the record or the cluster of records, said graphic attribute primitive defined by a decoration parameter value in the visualization set of parameters for said record or the cluster of records; and computer-executable program code for graphically rendering the sorted records or the clusters of records having the associated geometric and graphic attribute primitives.

12. The computer program code of claim 11, wherein the set of visualization parameters for said records or the cluster of records in the database are arranged in form of a style sheet.

13. The computer program code of claim 11, wherein a visualization parameter of the set operates on a single record or cluster of records of the database.

14. The computer program code of claim 11, wherein the records or the clusters of records are graphically rendered in a time that is substantially a linear function of the number of records in the data table.

15. The computer program code of claim 11, wherein the geometric attribute primitives are selected from the group consisting of position, size, and shape.

16. The computer program code of claim 15, wherein the shape is selected from the group consisting of rectangle, polygon, ellipse, line and text.

17. The computer program code of claim 11, wherein the graphic attribute primitives are selected from the group consisting of color, pattern, font, and line width.

18. The computer program code of claim 11, further comprising:

selecting clusters from the clustered records;

associating sub-visualization parameters with selected clusters; and performing the steps of associating and graphically rendering on the selected clusters.

19. The computer program code of claim 11, wherein graphically rendering includes displaying visualizations selected from the group consisting of Gantt charts, histograms and 2D- and scatter plots, tree structures, and data tables.

20. Method for graphically representing data objects of a dataset using visualization parameters, comprising:

partitioning the data set into groups of objects, each object in a group having a common cluster parameter value;

sorting the groups of records according to a sort parameter value;

sequentially evaluating synthesizers for each group of objects, once for each object in the group, with the last evaluation determining a value of the synthesizer for the group;

sequentially evaluating local variables for each group of objects, thereby determining current values of the local variables, based on the synthesizer or local variable values, associating a graphic primitive with each group according to a shape selection parameter value;

based on the synthesizer or local variable values, associating with the graphic primitive a decoration parameter value according to a decoration parameter value;

sequentially evaluating each of the local variables to determine new current values for the local variables; and graphically rendering the data objects having the associated graphic primitives and decoration parameters.

* * * * *